(12) United States Patent
Ito et al.

(10) Patent No.: US 6,828,708 B2
(45) Date of Patent: Dec. 7, 2004

(54) MOTOR DEVICE INCLUDING A THRUST BEARING HAVING A THRUST PLATE

(75) Inventors: Hiroshi Ito, Nagano-ken (JP); Tetsuya Haruyama, Saitama-ken (JP); Jyunichi Kawashima, Saitama-Ken (JP)

(73) Assignees: Sanyo Electric Co., Ltd., Moriguchi (JP); Kumagaya Seimitsu Co., Ltd., Kitaadachi-gun (JP)

( * ) Notice: Subject to any disclaimer, the term of this patent is extended or adjusted under 35 U.S.C. 154(b) by 0 days.

(21) Appl. No.: 10/303,753

(22) Filed: Nov. 26, 2002

(65) Prior Publication Data

US 2003/0127926 A1 Jul. 10, 2003

(30) Foreign Application Priority Data

Jan. 9, 2002 (JP) .......................................... 2002-2855

(51) Int. Cl.[7] ................................................ H02K 7/08
(52) U.S. Cl. ...................... 310/90; 310/67 R; 310/258; 384/126
(58) Field of Search ................................ 310/90, 67 R, 310/268; 384/126

(56) References Cited

U.S. PATENT DOCUMENTS

| | | | | |
|---|---|---|---|---|
| 5,413,413 A | * | 5/1995 | Sakashita et al. ........... | 384/126 |
| 5,445,456 A | * | 8/1995 | Isoda et al. .................. | 384/126 |
| 5,446,325 A | * | 8/1995 | Iwabuchi .................... | 310/67 R |
| 5,783,884 A | * | 7/1998 | Fujishima et al. ............ | 310/90 |
| 5,793,135 A | * | 8/1998 | Suzuki et al. ................. | 310/90 |
| 5,828,151 A | * | 10/1998 | Bustamante et al. .......... | 310/90 |
| 5,861,687 A | * | 1/1999 | Iwanaga et al. .............. | 310/90 |
| 6,002,188 A | * | 12/1999 | Yagi ............................ | 310/90 |
| 6,104,114 A | * | 8/2000 | Takeda et al. ................ | 310/90 |
| 6,252,322 B1 | * | 6/2001 | Kawawada et al. .......... | 310/90 |

* cited by examiner

Primary Examiner—Burton S. Mullins
Assistant Examiner—Yahveh Comas
(74) Attorney, Agent, or Firm—Armstrong, Kratz, Quintos, Hanson & Brooks, LLP

(57) ABSTRACT

A motor device suppressed in tilt of the rotor shaft and improved in resistance to rotational vibration without enlarging the thickness direction. A stator plate 1 supports a radial bearing 3 and thrust bearing 5 through an auxiliary support plate 15. The auxiliary support plate 15 has a bent flange 15a at its outer circumference, has the radial bearing 3 fastened to the region inside the flange 15a, and has the thrust bearing 5 placed on the inside region so as to surround the same. The auxiliary support plate 15 is made to fit in the stator plate 1, while the flange 15a is supported on the top surface of the stator plate 1. The rotor plate 9 has a rotor shaft 11 and drive magnet 13. The rotor shaft 11 is axially supported by the radial bearing 3 and abuts against the thrust bearing 5.

2 Claims, 5 Drawing Sheets

MOTOR DEVICE INCLUDING A THRUST BEARING HAVING A THRUST PLATE

BACKGROUND OF THE INVENTION

1. Field of the Invention

The present invention relates to a motor device, more particularly relates to an improvement of a motor device for directly rotating for example a 3.5 inch flexible disk.

2. Description of the Related Art

In the past, as the motor device for directly supporting and rotating a 3.5 inch flexible disk etc., as shown in FIG. 4, there has been known a spindle configuration directly fastening a radial bearing 3 comprised of for example an oil-less metal by press fitting to a magnetic material stator plate 1 forming a not shown electronic circuit, placing a thrust bearing 5 comprised of hard balls 5a held by a retainer 5b gripped between thrust receiving plates 5c and 5d so as to be fit at the outer circumference of the radial bearing 3, fastening a plurality of drive coils 7 flat against the stator plate 1 so as to surround the thrust bearing 5, axially supporting the rotor shaft 11 holding the rotor plate 9 at the radial bearing 3, making the rotor plate 9 abut with the thrust receiving plate 5d, and making a drive magnet 13 fastened to the rotor plate 9 face the drive coils 7.

The motor drive of this configuration has the rotor shaft 11 supported by the radial bearing 3 in the radial direction and has the rotor plate 9 rotating in the state supported by the thrust bearing 5 in the thrust direction, so if holding the flexible disk by a not shown known holding method at the back surface of the rotor plate 9, this can be made to rotate.

Summarizing the problems to be solved by the invention, the motor device of the above configuration has the radial bearing 3 axially supporting the rotor shaft 11 directly fastened to the stator plate 1 by press fitting, so particularly the stator plate 1 easily warps due to the pressure at the time of press fitting, the axial center of the rotor shaft 11 tilts and rotational vibration occurs, the motor itself is attached to the electronic apparatus at a tilt, and accurate planar rotation of the flexible disk can no longer be secured.

Further, as shown by the broken lines in FIG. 5, the magnetic material stator plate 1 easily deforms due to attraction of the drive magnet 13 fastened to the rotor plate 9, the radial bearing 3 also displaces so that the axial center of the rotor shaft 11 tilts, and accurate planar rotation of the flexible disk becomes hard to secure.

SUMMARY OF THE INVENTION

An object of the present invention is to provide a motor device suppressing tilting of the rotor shaft and improving resistance to rotational vibration without enlarging the thickness dimension in the rotor shaft direction.

To achieve the above object, there is provided a motor device comprising a stator unit of a motor having a stator plate; a rotor unit of the motor; a thrust bearing for receiving pressure in a thrust direction of the rotor unit and securing rotation of the rotor unit and securing rotation of that rotor unit; and an auxiliary support plate on which a thrust receiving plate of the stator unit side in that thrust bearing of the stator unit side in the thrust bearing is placed and supporting the thrust bearing at the stator unit.

The auxiliary support plate has a flange formed at a region outside from the thrust receiving plate and formed bent in an axial direction of the rotor unit side. The region inside of the flange is fit into the stator plate, so the flange is placed on the stator plate facing the rotor unit and supported by the same.

Preferably, the auxiliary support plate is formed by a material harder than the stator plate.

BRIEF DESCRIPTION OF THE DRAWINGS

These and other objects and features of the present invention will become clearer from the following description of a preferred embodiment given with reference to the attached drawings, in which.

DESCRIPTION OF THE PREFERRED EMBODIMENTS

Figure 1:
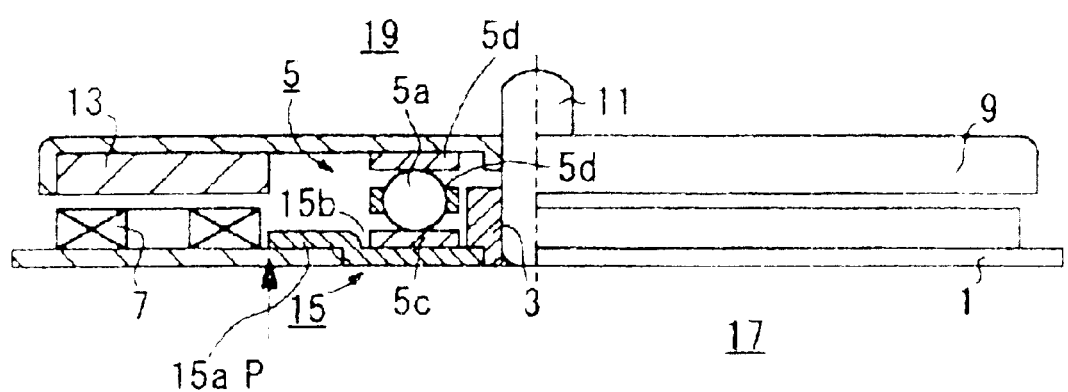
FIG. 1 is a longitudinal semi-sectional view of a motor device according to the present invention.

Next, an embodiment of the present invention will be explained with reference to the drawings. Note that parts common with the related art are assigned the same reference numerals.

FIG. 1 is a longitudinal semi-sectional view of a motor device according to the present invention.

In FIG. 1, a stator plate 1 is formed from steel plate or another ferromagnetic material. A radial bearing 3 and thrust bearing 5 are supported by it through an auxiliary support plate 15. The stator plate 1 has an electronic circuit (not shown) at the top surface in FIG. 1 and is fastened to a not shown electronic apparatus by suitable fastening means.

Figure 2:
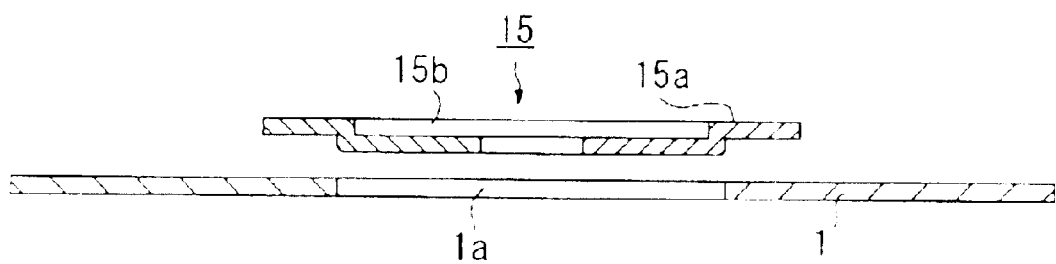
FIG. 2 is a disassembled sectional view of a stator plate and auxiliary support plate in the motor device of FIG. 1.

The auxiliary support plate 15, as shown in FIG. 2, is formed flat in a ring plate shape by a material equal to or greater in hardness than the stator plate 1 and has a flange 15a formed somewhat bent. The region inside of the flange 15a forms a recessed part 15b.

At the center of the recessed part 15b of the auxiliary support plate 15 is fastened the above radial bearing 3 comprised of for example an oil-less metal. The above-mentioned thrust bearing 5 is supported so as to surround the radial bearing 3.

The auxiliary support plate 15 is fastened by fitting the recessed part 15b into a support hole 1a formed in the stator plate 1 and making the flange 15a abut against the top surface of the stator plate 1 in the figure so that it spreads out large from the outer circumference of the thrust bearing.

The thrust bearing 5 is formed from a a plurality of hard balls 5a held dispersed in a ring plate shaped retainer 5b gripped between ring shaped thrust receiving plates 5c and 5d so as to abut against the hard balls 5a via this retainer 5b. The retainer 5b is formed by a material allowing the hard balls 5a to freely slide and rotate, while the thrust receiving plates 5c and 5d are formed by a hard material allowing the hard balls 5a to freely slide and rotate.

The stator plate 1 has a plurality of drive coils 7 fastened to it flat and annularly so as to surround the outer circumference of the flange 15a of the auxiliary support plate 15 and connected to the above electronic circuit.

The stator unit 17 is formed by these stator plate 1, radial bearing 3, thrust bearing 5, drive coil 7, auxiliary support plate 15, etc.

The rotor plate 9 is formed from steel plate or another ferromagnetic material in a flat cup shape, has a ring plate shaped drive magnet 13 at the inside of this, and holds a rotor shaft 11 passing through it at its center of rotation.

The rotor plate 9 is rotably supported by making it abut against another thrust receiving plate 5d (top side in the figure) forming the thrust bearing 5 at the inner circumference of the drive magnet 13, inserting the rotor shaft 11 in the radial bearing 3, and making the drive magnet 13 face the drive coil 7 with a slight clearance.

These rotor plate 9, rotor shaft 11, drive magnet 13, etc. form the rotor unit 19 to give a spindle configuration.

This motor device of this spindle configuration can make a for example flexible disk (not shown) held at the back surface of the rotor plate 9 rotate by switching and energizing the plurality of drive coils 7 to make the rotor plate 9 rotate.

Further, in this motor device, an auxiliary support plate 15 supporting the thrust bearing 5 is provided with a flange 15a of a larger diameter than the thrust bearing 5. The thrust bearing 5 is arranged at the region inside of the flange 15a. The flange 15a is supportedly laid on the stator plate 1. Therefore, the point P of warping of the stator plate 1 due to the attraction between the drive magnet 13 and stator plate 1 is at the front end of the flange 15a or its outer circumference.

Therefore, the stator plate 1 is resistant to warping. Even if the axial center of the rotor shaft 11 tilts, the motor device itself is rarely attached to the electronic apparatus tilted. Accurate planar rotation of the rotor plate 9 is secured and the flexible disk etc. can be made to rotate planarly accurately.

Figure 3:
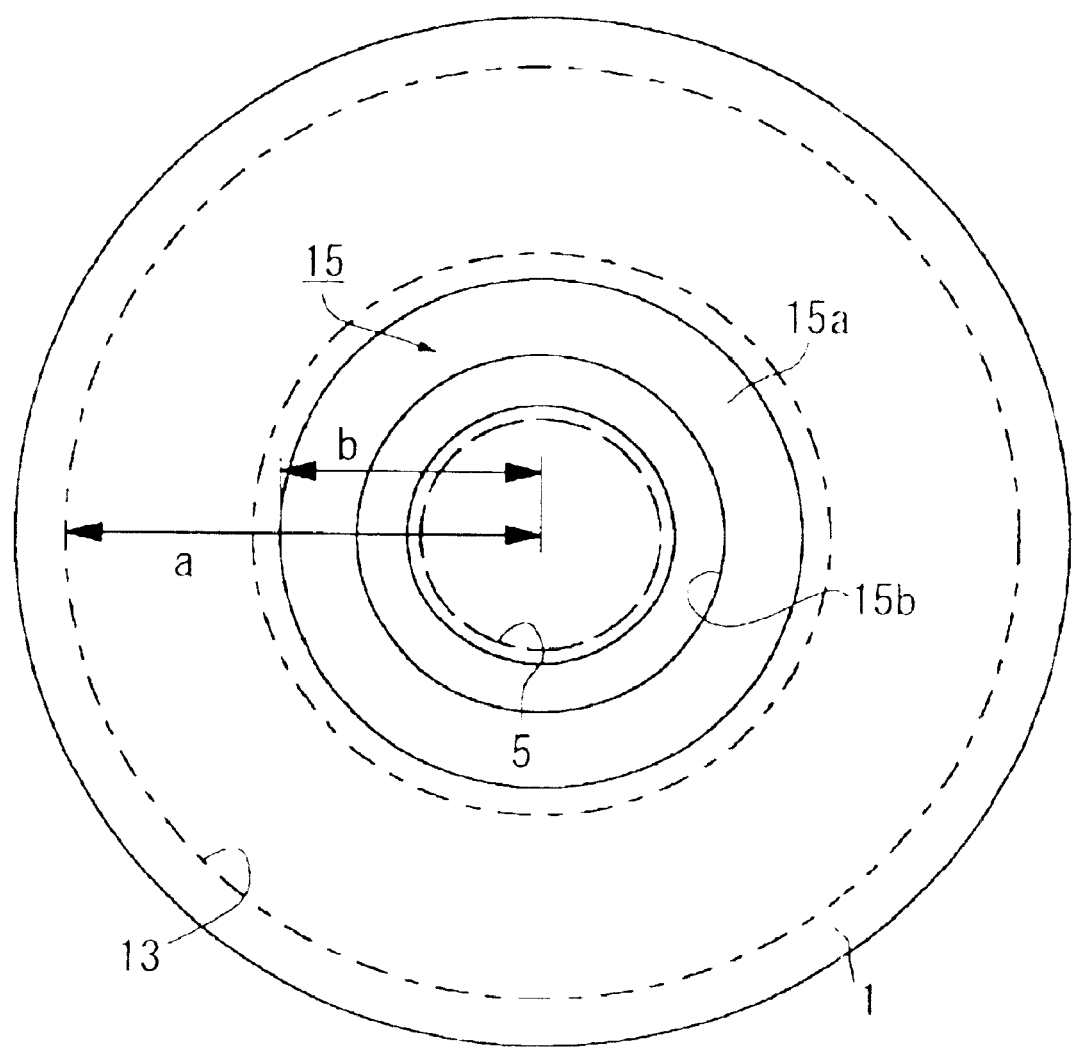
FIG. 3 is a schematic plan view showing the relationship between the stator plate and auxiliary support plate in the motor device of FIG. 1.
Figure 4:
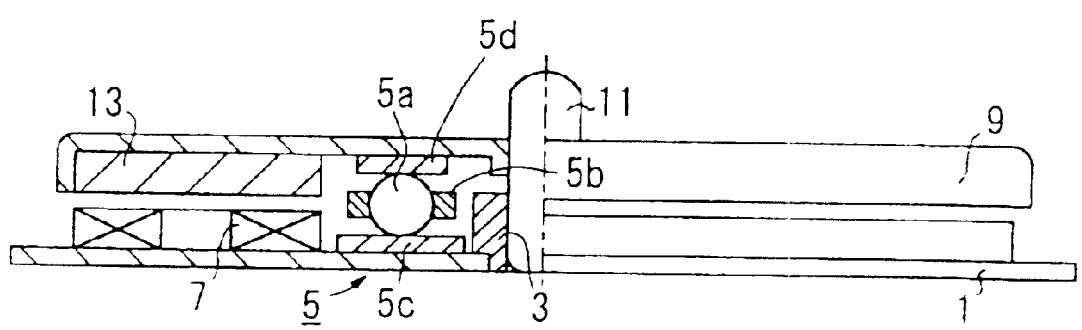
FIG. 4 is a longitudinal semi-sectional view of a motor device of the related art.
Figure 5:
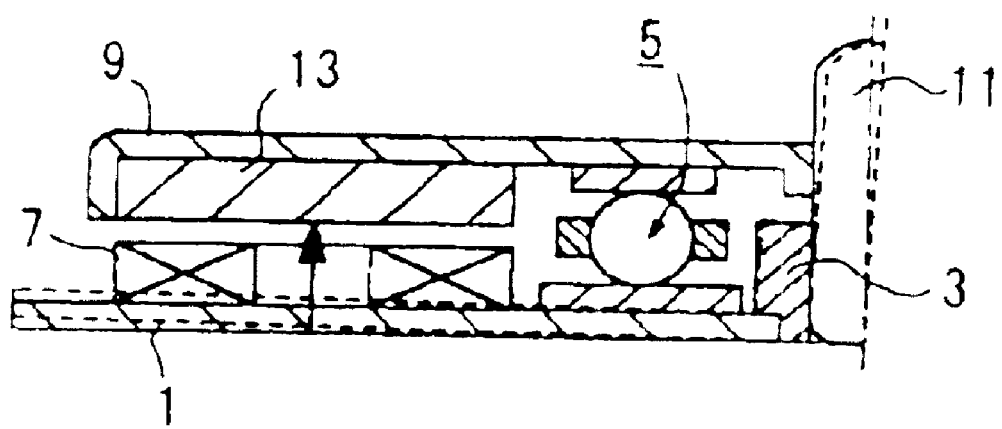
FIG. 5 is a schematic longitudinal semi-sectional view for explaining the action of the motor device of FIG. 4.

In particular, as shown in FIG. 3, if setting the radius dimension b to the outer circumference of the flange 15a in the auxiliary support plate 15 to at least ⅔ of the radius dimension a of the drive magnet 13 to make the flange protrude largely, it is possible to suppress warping of the stator plate 1 to a negligible extent.

Further, the auxiliary support plate 15 forms a flat ring plate and is fastened by fitting the recessed part 15b in the support hole 1a of the stator plate 1. An annular flange 15a bent somewhat like a step in the axial direction of the rotor unit 19 is placed on the stator plate 1 for fastening, so the dimension of the auxiliary support plate 15 in the thickness direction has no effect on the dimension of the motor device in the axial direction and results in a thin configuration.

Further, the radial bearing 3 is fastened by press fitting to the auxiliary support plate 15. If the auxiliary support plate 15 is formed from a material harder than the stator plate 1, warping due to the press fitting is difficult to occur.

Note that the thrust bearing 5 in the above-mentioned motor device of the present invention is not limited to this. The invention may also be worked by another known thrust bearing. The motor device of the present invention is not limited to the above spindle configuration. The application is also not limited to supporting and rotating a flexible disk.

Summarizing the effects of the invention, as explained above, the motor device of the present invention has a thrust bearing receiving pressure in a thrust direction of the rotor unit and securing rotation of the rotor unit and an auxiliary support plate on which the thrust receiving plate of the stator unit side at the thrust bearing is laid and supporting the thrust bearing at the stator unit, the auxiliary support plate has a flange formed at a region outside from the thrust receiving plate and formed bent in the axial direction of the rotor unit side, the region inside the flange is fit into the stator plate, and the flange is laid on the stator plate facing the rotor unit and supported by the same, so even if the stator plate is attracted by the drive magnet, it is resistant to warping, tilting of the rotor shaft can be suppressed and resistance to rotational vibration improved, the configuration is simple and inexpensive, and the thickness dimension in the rotor axial direction is not allowed to become larger.

Further, if the auxiliary support plate press fitting the radial bearing is formed from a material harder than the stator plate, warping due to the press fitting does not easily occur.

While the invention has been described with reference to specific embodiments chosen for purpose of illustration, it should be apparent that numerous modifications could be made thereto by those skilled in the art without departing from the basic concept and scope of the invention.

What is claimed is:

1. A motor device comprising:
   a stator unit of a motor having a stator plate;
   a rotor unit of said motor;
   a radial bearing axially supporting said rotor unit;
   a thrust bearing, having thrust receiving plates, for receiving pressure in a thrust direction of the rotor unit and securing rotation of said rotor unit; and
   an auxiliary support plate, separate from said thrust bearing, on which one of said thrust receiving plates on said stator unit side of said thrust bearing is placed and supporting said thrust bearing at said stator unit,
   said auxiliary support plate having a flange formed bent in an axial direction of said rotor unit side at a region outside from said thrust bearing, and a region inside the flange, said region inside the flange being fit into said stator plate,
   said flange being placed on said stator plate facing said rotor unit and being supported by the same, and
   said region inside the flange rigidly supporting said radial bearing.

2. A motor device as set forth in claim 1, wherein said auxiliary support plate is formed of a material harder than said stator plate.

* * * * *

UNITED STATES PATENT AND TRADEMARK OFFICE
CERTIFICATE OF CORRECTION

PATENT NO.     : 6,828,708 B2
DATED          : December 7, 2004
INVENTOR(S)    : Ito et al.

It is certified that error appears in the above-identified patent and that said Letters Patent is hereby corrected as shown below:

<u>Title page,</u>
Item [73], Assignees, change "Sanyo Electric Co., Ltd., Moriguchi (JP); Kumagaya Seimitsu Co., Ltd., Kitaadachi-gun (JP)" to be -- Sanyo Electric Co., Ltd., Oosaka-fu (JP); Kumagaya Seimitsu Co., Ltd., Saitama-ken (JP) --

Signed and Sealed this

Third Day of May, 2005

JON W. DUDAS
*Director of the United States Patent and Trademark Office*